US012802040B2

(12) United States Patent
Vasnani et al.

(10) Patent No.: US 12,802,040 B2
(45) Date of Patent: Nov. 17, 2026

(54) SYSTEM AND METHOD OF DIGITAL SCHEDULE PROCESSING

(71) Applicant: Nice Ltd., Ra'anana (IL)

(72) Inventors: Kanchan Vasnani, Indore (IN); Vaibhav Chobe, Pune (IN); Richa Deo, Jamshedpur (IN)

(73) Assignee: Nice Ltd. (IL)

( * ) Notice: Subject to any disclaimer, the term of this patent is extended or adjusted under 35 U.S.C. 154(b) by 172 days.

(21) Appl. No.: 18/469,648

(22) Filed: Sep. 19, 2023

(65) Prior Publication Data

US 2025/0094933 A1 Mar. 20, 2025

(51) Int. Cl.
*G06Q 10/00* (2026.01)
*G06Q 10/04* (2023.01)
*G06Q 10/1093* (2023.01)

(52) U.S. Cl.
CPC ......... *G06Q 10/1093* (2013.01); *G06Q 10/04* (2013.01)

(58) Field of Classification Search
None
See application file for complete search history.

(56) References Cited

U.S. PATENT DOCUMENTS 6,192,346 B1 * 2/2001 Green .................... G06Q 10/10 705/7.18
7,058,589 B1 6/2006 Leamon
7,725,339 B1 * 5/2010 Aykin .................... G06Q 10/10 705/7.14
8,331,549 B2 * 12/2012 Fama ..................... G06Q 10/06 379/265.06
9,378,476 B1 6/2016 Schwartz
9,883,037 B1 1/2018 Lewis et al.
10,083,489 B1 * 9/2018 Nathoo ................ G06Q 40/125
10,867,291 B1 * 12/2020 Yien ..................... G06F 21/305
11,010,699 B1 * 5/2021 Lu ........................ G06F 3/04842
2002/0143599 A1 * 10/2002 Nourbakhsh .... G06Q 10/06375 705/321
2007/0168212 A1 * 7/2007 Murakawa ..... G06Q 10/063116 705/7.16
2014/0200941 A1 * 7/2014 McDaniel ...... G06Q 10/063116 705/7.16
2020/0186647 A1 * 6/2020 Gogate ............... H04M 3/5175
2021/0266405 A1 * 8/2021 Stepanov ......... G06Q 10/06315
2022/0027837 A1 * 1/2022 D'Attilio ............ H04M 3/5175
2022/0101266 A1 * 3/2022 Silveira .............. G06Q 20/0855
2025/0148385 A1 * 5/2025 Bell ................. G06Q 10/06398

OTHER PUBLICATIONS

MI Restrepo (Constrained network-based column generation for the . . . ScienceDirect.com • 2012 (Year: 2012).*

(Continued)

*Primary Examiner* — Hafiz A Kassim

(57) ABSTRACT

Methods and systems for digital scheduling include periodically determining, from a datastore of agent profiles, a set of agents which satisfy a predefined time-off criterion; and notifying, via a digital message, one or more agents of the determined set of agents of a recommended list of dates on which to take a time-off, wherein the recommended list of dates is generated in accordance with staffing prediction data for the dates.

16 Claims, 14 Drawing Sheets

200

(56) References Cited

OTHER PUBLICATIONS

"Improving volunteer scheduling for the Edmonton Folk Festival" L Gordon, E Erkut—Interfaces, 2004—pubsonline.informs.org (Year: 2004).
Day, Paul R. and Ryan, David M. Flight Attendant Rostering for Short-Haul Airline Operations. Institute for Operations Research and the Management Sciences, Maryland, USA, downloaded Oct. 18, 2021. (Year: 1997).
Ingels, Jonas, Maenhout, Broos. The impact of reserve duties on the robustness of a personnel shift roster: An Empirical investigation. Computers & Operations Research 61 (2015), pp. 153-169, retrieved from Science Direct. (Year: 2015).
"Workplace Automation for Contact Center Teams," Intradiem, Accessed on Oct. 12, 2022.
"The Forgotten Factors of Workforce Forecasting," Nice, Accessed on Oct. 31, 2023.
"WFM with AI-based forecasting," Nice, Accessed on Oct. 31, 2023.
"Workforce Management Agile Scheduling," Nice, Accessed on Oct. 31, 2023.

* cited by examiner

SYSTEM AND METHOD OF DIGITAL SCHEDULE PROCESSING

FIELD OF THE INVENTION

The present invention relates generally to digital scheduling, in particular to manipulation of schedules focusing on time-off.

BACKGROUND OF THE INVENTION

Technology to store and manipulate schedules of resources such as workers exists. It can be important for employees, such as contact centre agents, to take time off (e.g. paid time off "PTO") regularly, especially in the contact center industry where there is typically a huge demand for agents to handle incoming communications such as calls around the clock to meet the contact center's key performance indicators (KPIs).

When agents are not able to take time off regularly, it may, for example: adversely impact their work-life balance; and/or increase their stress levels and burnout rates. These factors may eventually result in: reduced agent productivity; and/or decreased job satisfaction levels.

Since agents are typically key drivers of the contact center, the latter may also be negatively impacted. In general when the time off allowance of the agents are due to expire or lapse at the end of the year, there may be an increase in requests for time off. For some regions, this end-of-year period may coincide with the contact center's peak business season, e.g. Christmas. As a result of increased requests for time off: contact centers may become understaffed, and the business and customer satisfaction levels may be negatively impacted. However, if time off requests of the agents are declined, then employee satisfaction may be negatively impacted.

SUMMARY

Some embodiments of the invention may solve the problems identified above by identifying agents who have not taken time off based on a predefined configuration (for example as set by a supervisor or manager who may provide input to a work force management (WFM) system via a terminal), and sending notifications to the agent prompting them to take time off. The notifications may include a list of suggested dates on which the agent can avail their time off. These suggested dates may be, for example, dates for which the contact center is predicted to be less busy, predicted for example based on historic contact center data.

Some embodiments of the invention may therefore result in maintaining a work life balance by notifying agents to take a break in a distributed manner throughout the year, and limiting any end-of-year rush to take time off to avoid the time off being lost (e.g. time off may not "roll over" into the next year (for example a "use it or lose it" policy), or only a certain limited number of days (e.g. 5) may be eligible to be carried over). This may have a positive impact on the contact center's staffing.

According to one or more embodiments, there is provided a method for digital scheduling, the method including, using a computer processor: periodically determining, from a datastore of agent profiles, a set of agents which satisfy a predefined time-off criterion; and notifying, via a digital message, one or more agents of the determined set of agents of a recommended list of dates on which to take a time-off, wherein the recommended list of dates is generated in accordance with staffing prediction data for the dates.

According to some embodiments, an agent satisfies the predefined time-off criterion if the agent has not taken a predefined number of time-offs within a predefined time period.

According to some embodiments, the recommended list of dates notified to a first agent of the determined set of agents is different to a recommended list of dates notified to a second agent of the determined set of agents.

According to some embodiments, the method includes classifying the determined set of agents into at least two subsets in accordance with historic time-off data; and prioritizing an approval of a time-off request submitted by a first agent of a first subset of the at least two subsets over an approval of a time-off request submitted by an agent of a second subset of the at least two subsets.

According to some embodiments, the prioritizing comprises initiating an approval process of the time-off request submitted by the agent of the first subset after a predefined first duration, and delaying initiation of the approval process for the time-off request submitted by the agent of the second subset for a predefined second duration greater than the first duration.

According to some embodiments, the method includes delaying initiation of the approval process for a time-off request submitted by an agent who does not satisfy the time-off criterion for a predefined third duration greater than the second duration.

According to some embodiments, the first subset includes agents with a greater number of rejected time-offs than agents of the second subset.

According to one or more embodiments, there is provided a system for digital scheduling, the system including: at least one computer processor; and a computer readable storage medium containing instructions which, when executed by the at least one computer processor, cause the at least one computer processor to: periodically determine a set of agents who satisfy a predefined time-off criterion; and notify at least some agents of the determined set of agents of a recommended list of dates on which to take a time-off, wherein the recommended list of dates is generated by the at least one computer processor in accordance with staffing prediction data for said dates.

According to some embodiments, the at least one computer processor is configured to: classify the determined set of agents into at least two subsets in accordance with historic time-off data; and prioritize an approval of a time-of request submitted by an agent of a first subset of the at least two subsets over an approval of a time-off request submitted by an agent of a second subset of the at least two subsets.

According to some embodiments, the at least one computer processor is configured to prioritize the approval of the time-off request submitted by the agent of the first subset by being configured to: initiate an approval process of the time-off request submitted by the agent of the first subset after a predefined first duration; and delay initiation of the approval process for the time-off request submitted by the agent of the second subset for a predefined second duration greater than the first duration.

According to some embodiments, the at least one computer processor is configured to delay initiation of the approval process for a time-off request submitted by an agent who does not satisfy the time-off criterion for a predefined third duration greater than the second duration.

According to one or more embodiments, there is provided a method of prioritizing time-off requests in a digital schedule, the method including, using a computer processor: identifying one or more agent profiles which satisfy a predefined schedule criterion; and sending, to at least one agent corresponding to the identified one or more agent profiles one or more time periods on which to take a time-off, wherein the recommended list of time periods is generated in accordance with staffing prediction data for the time periods.

According to some embodiments, the method includes grouping the identified one or more agents into one or more subgroups based on a time-off history of the identified one or more agents; and prioritizing a processing of a time-off request submitted by one of the identified one or more agents based on a subgroup thereof.

According to some embodiments, the prioritizing includes approving or rejecting a time-off request submitted by an agent belonging to a first subgroup, and approving or rejecting a time-off requested submitted by a different agent belonging to a second subgroup after a predetermined time.

According to some embodiments, the first subgroup includes agents with a greater number of rejected time-offs than agents of the second subgroup.

According to some embodiments, the prioritizing further comprises approving or rejecting a time-off request submitted by an agent which does not satisfy the predefined schedule criterion only after approving or rejecting any requests from agents belonging to the first or second subgroups.

According to some embodiments, the predefined schedule criterion includes a first number of time-offs not taken within a second number of months.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Embodiments of the invention relate generally to digital scheduling.

As used herein, "Call Center" may refer to a centralized office used for receiving or transmitting a large volume of enquiries by telephone. An inbound call center may be operated by a company (e.g. a tenant) to administer incoming product or service support or information enquiries from consumers.

As used herein, "Contact Center" may refer to a call center which handles other types of communications other than voice telephone calls, for example, email, message chat, SMS, etc. Reference to call center should be taken to be applicable to contact center.

As used herein, an "Agent" may be a contact center worker that answers incoming contacts, handles customer requests and so on.

As used herein, "Work Force Management (WFM)" may refer to an integrated set of processes that a company uses to optimize the productivity of its employees. WFM involves effectively forecasting staffing requirements and creating and managing staff schedules to accomplish a particular task on a day-to-day and hour-to-hour basis. Embodiments of the invention may be part of, integrated with, or otherwise interact with new and existing WFM technology and processes.

"Resource Requirements" or "Staffing Requirements" may refer to the required amount of resources or personnel (e.g. agents) needed (e.g. at a contact center) to handle expected/forecasted contacts in accordance with quality-of-service metrics. Embodiments of the invention may ensure that staffing requirements are met by, for example, only allowing shift trades where both agents have a common skill such that the required staffing for that skill is preserved for the time periods of the traded shifts. While resources such as personnel are discussed, other resources may be included.

Figure 1:
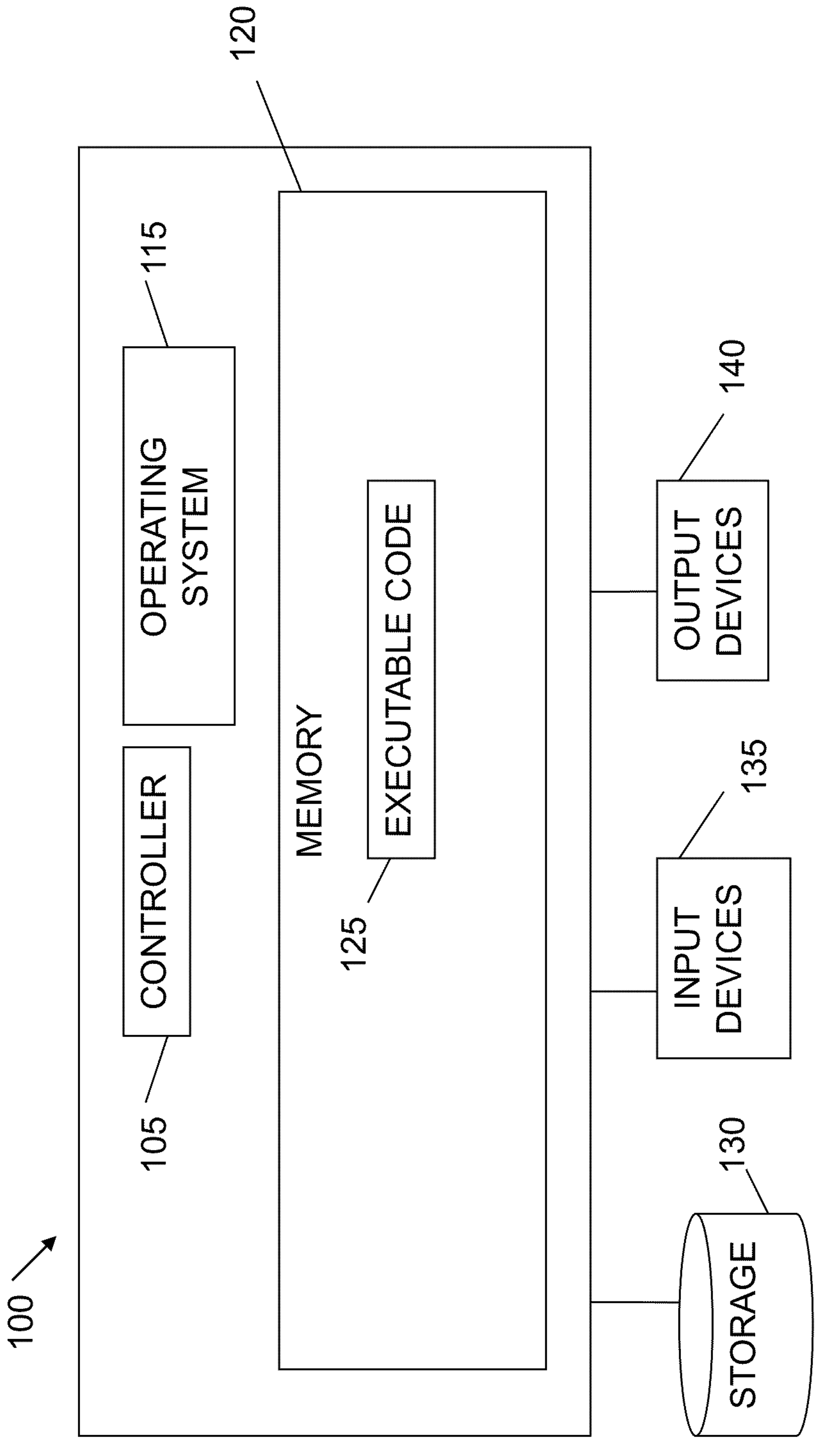
FIG. 1 shows a high-level block diagram of an exemplary computing device which may be used with some embodiments of the invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out methods as disclosed herein, and/or data as disclosed herein such as resource description, agent data (e.g. skill data), schedule data (e.g. shift times, scheduled work days, scheduling unit), shift parameters, agent preferences, approval criteria, validation criteria, or any other type of data.

Executable code 125 may be any application, program, process, task, or script. Executable code 125 may be executed by controller 105 possibly under control of operating system 115. For example, executable code 125 may be or execute one or more applications performing methods as disclosed herein, such as for updating an assignment of resources. In some embodiments, more than one computing device 100 or components of device 100 may be used. One or more processor(s) 105 may be configured to carry out embodiments of the present invention by, for example, executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 2:
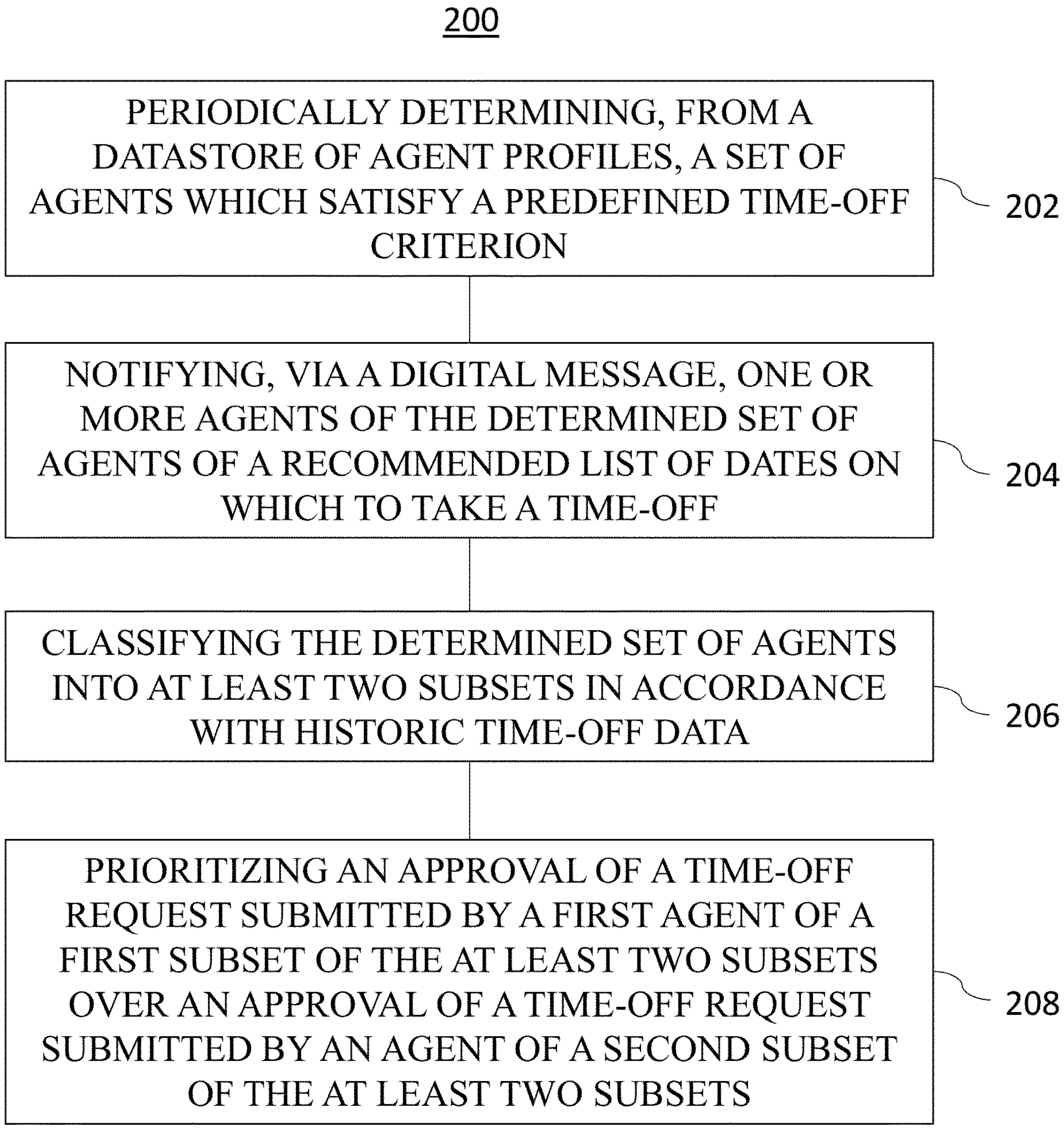
FIG. 2 shows a flowchart of a method for digital scheduling, according to some embodiments of the invention.

FIG. 2 shows a flowchart of a method 200 for digital resource management or scheduling, according to some embodiments of the invention. Method 200 may be a computer implemented method, for example one or more steps of method 200 may be carried out in part or in whole by a computer processor such as controller/processor 105 as shown in the computing device 100 of FIG. 1.

Method 200 may include periodically determining, from a datastore of resource (e.g. agent) profiles, a set of resources or agents which satisfy a predefined or predetermined criterion such as a time-off criterion (Step 202). The datastore of agent profiles may be a data storage (e.g. a database), such as storage 130 shown in FIG. 1. An agent profile may include data relating to an agent. For example, an agent profile may include the agent name, agent ID (such as a universally unique identifier UUID), shift data, schedule data, time off allowance (e.g. accrued or earned time off), time off taken, time off scheduled, or the like. Other data may be used. A predefined time-off criterion may be predefined by a manager or supervisor by input to a system implementing the method, for example by manager input to a terminal connected to a computing device (such as a server) configured to carry out the method.

In some embodiments, an agent satisfies the predefined time-off criterion if the agent has not taken a predefined number of time-offs within a predefined time period. For example, a manager may predefine, preconfigure, or otherwise set a time-off criterion such that agents who have not taken X number of time-offs within the past Y number of months are identified. For example, agents who have not taken two time-offs in the last two months may be identified, for example based on data included in the agent profile. Other configurable numbers X and Y of time-offs and months (or other time periods such as weeks, days, etc.) may be used.

Method 200 may include notifying, for example via a digital message, one or more agents of the determined set of agents of a recommended list of dates on which to take a time-off (Step 204). The notifying may be by means of a digital message such as email, short message service (SMS), in-system message (e.g. an application/app notification message), or the like.

The recommended list of dates may be generated in accordance with staffing prediction data for those dates. For example, based on or using historic staffing data for the contact center, a list of dates may be generated where such dates are predicted to require less staffing than on other dates (e.g. overstaffed days). These may be dates where there are more staff scheduled than necessary for the predicted volume of work for that date. The list of dates may be presented in an order relating to the level of staffing predicted (e.g. dates where the contact center is predicted to be less busy may be presented first).

The recommended list of dates may be specific for that agent. For example, the recommended list of dates notified to a first agent of the determined set of agents may be different to a recommended list of dates notified to a second agent of the determined set of agents. The list of dates can also be the same. For example, to avoid agents receiving the same dates and the possibility that agents will request the same days off, the list of dates generated in accordance with staffing prediction data may be divided among the determined agents to reduce the likelihood that different agents request the same day off, which could otherwise result in a time-off request needing to be rejected.

Figure 7:
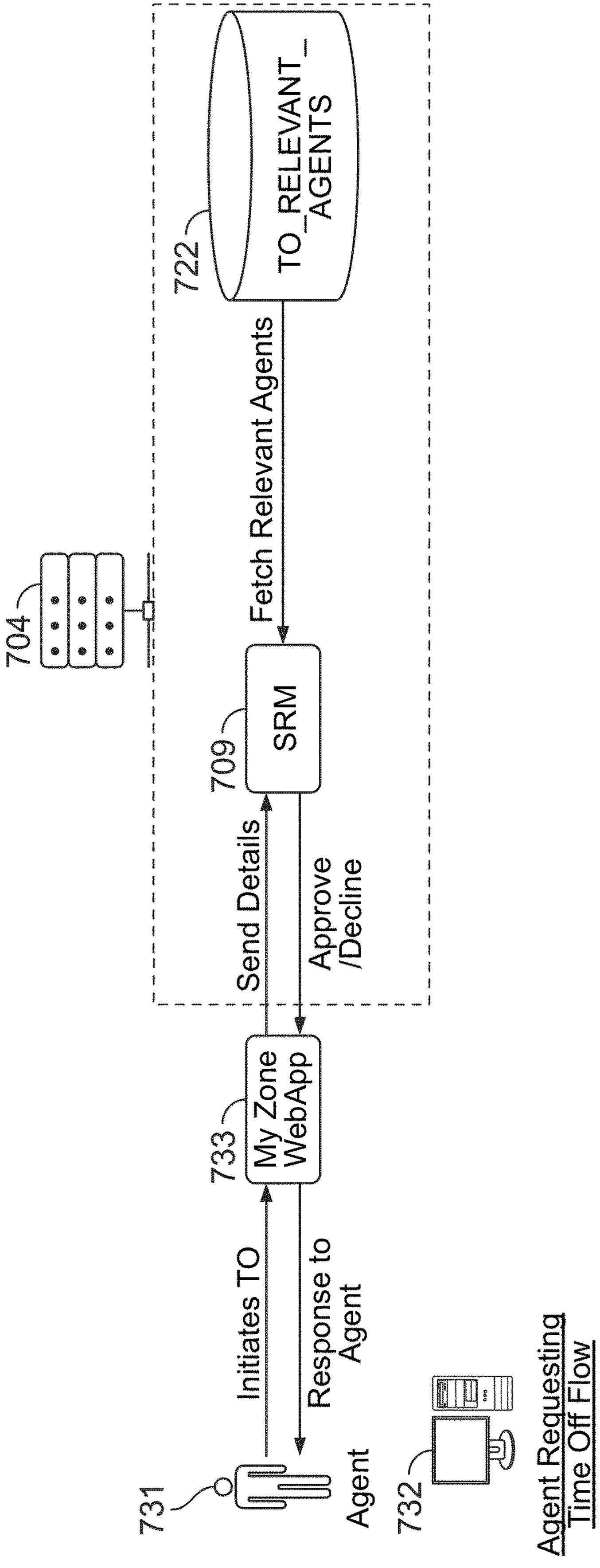
FIG. 7 shows an example flowchart, according to some embodiments of the invention.

An agent may receive the notifying digital message on a terminal, such as an agent terminal, which may be a computing device such as computing device 100 shown in FIG. 1. An agent may view the recommended list of dates using such an agent terminal. An agent terminal may be, for example, a personal computer (PC), laptop, smartphone, digital tablet, or the like. An agent terminal 732 is shown in FIG. 7, discussed further herein. The agent may be able to provide input to the terminal to request a time-off, for example the agent may click on (or otherwise provide input to the terminal, e.g. via a touchscreen) a recommended date and may be automatically directed to a time-off request platform, application/app, or website in order to request the time off. A request for a time off accessed in such a way may be partially filled using data based on the agent profile and the selected date.

In some embodiments, method 200 optionally includes classifying the determined set of agents into at least two subsets in accordance with historic time-off data (Step 206). For example, the determined set of agents may be grouped into a first subset which includes agents who recently (e.g. within the period of time forming part of the time-off criterion) requested a time-off but were rejected, and a second subset which includes agents who have not recently requested a time-off. For example, the first subset may include those agents who have a greater number of rejected time-offs than agents of the second subset, other numbers of subsets are possible, for example: a first subset of agents with two rejected time-offs within the predefined period of the time-off criterion; a second subset of agents with one rejected time-off within the predefined period of the time-off criterion; and a third subset of agents with zero rejected time-offs within the predefined period of the time-off criterion.

Consider an example using only two agents, Alice and Bob:

Alice requested time off in the last month but was denied.

Alice has had no other time off in the last two months.

Bob has not taken time off in the last month and a half.

Using the example time-off criterion of "Identify agents where 2 time-offs have not been taken within the past 2 months," then both Alice and Bob are identified by embodiments of the invention and form the set of identified agents. However, Alice and Bob may be classified into different subsets, for example based on the historic data in their agent profile, because Alice attempted to take time off but was denied. In such a circumstance, it may be desirable to offer Alice the opportunity to take a time off (e.g. by notifying her of a suggested list of dates) before extending the same opportunity to Bob, or for example, prioritizing approval of a time off request submitted by Alice over a time off request submitted by Bob. This may be considered fairer, or more equitable, and may prevent employee dissatisfaction from missing out on time off due to rejection or other agents taking the available dates.

Accordingly, method 200 may optionally include prioritizing an approval of a time-off request submitted by a first agent of a first subset of the at least two subsets over an approval of a time-off request submitted by an agent (e.g. a second agent) of a second subset of the at least two subsets (Step 208). In some embodiments, the prioritizing may include initiating an approval process of the time-off request submitted by the first agent of the first subset after a predefined first duration, and delaying initiation of the approval process for the time-off request submitted by the agent of the second subset for a predefined second duration greater than the first duration.

As an example, if both Alice and Bob are notified of a list of suggested dates on which to take a time off, and Bob submits a time off request before Alice, an approval process of Bob's request may not be started until after a predefined period of time to allow agents of a different subset to have their time off requests considered for approval first. For example, for a first subset which includes agents who recently requested a time-off but were rejected, an approval process for such requests may be initiated immediately (e.g. a delay of 0 hours), whereas for a second subset which includes agents who have not recently requested a time-off, the approval process may be delayed for a predefined configurable period of time, such as six hours.

Embodiments of the invention may also include delaying initiation of the approval process for a time-off request submitted by an agent who does not satisfy the time-off criterion for a predefined third duration greater than the second duration. For example, an agent, Eve, who has successfully taken three time-offs (e.g. had the time-offs approved) in the last two months may not be notified according to embodiments of the invention using the time-off criterion discussed in examples above, but Eve may want to request another (e.g. a fourth) time off. The approval process of a time-off requested by Eve may be delayed for a longer of period of time than for agents identified and notified by embodiments of the invention (e.g. Alice and Bob), so as to give these agents the opportunity to have their time-off requests considered on the available dates. For example, for agents such as Alice in a first subgroup which includes agents who recently requested a time-off but were rejected (which may be referred to as a "preferred" subgroup) the delay may by 0 hours, for agents such as Bob in a second subgroup which includes agents who have not recently requested a time-off 9 which may be referred to as an "eligible" subgroup) the delay may be 6 hours, and for agents such as Eve who are not identified by embodiments of the invention and thus not classified into a subgroup (which may be referred to as "non-eligible agents" or "deferred agents") the delay may be 24 hours. FIG. 4B, discussed further herein, shows such a configuration which can be set by a manager using a user interface as depicted: the manager may provide input via a terminal such as a computing device to select, toggle, or otherwise edit a delay or hold time configuration for preferred, eligible, and non-eligible agents.

The approval process may be a manual approval process, e.g. a manager providing input via a terminal to accept or reject the time off-request, after which a digital process further processes a digital schedule, or the approval process may be an automatic approval process which approves or rejects requests according to predefined approval criteria. For example, the pre-defined approval criteria may include that if an agent was notified of a suggested date on which to take a time-off and subsequently did request a time-off for a recommended date, the time-off request may be automatically approved. A request may be automatically rejected if, for example, the agent does not have any remaining time-off balance to be taken.

Embodiments of the invention may be integrated with, and may influence, existing processes and architecture components of existing WFM applications. For example, embodiments of the invention may affect and improve, technology such as a Schedule Requests Manager microservice (MS) and/or a Schedule manager microservice. A Schedule Requests Manager allows agents to request changes to their own schedules by using Shift Trade, and to allow processing of Trade requests for Auto approval. These requests include any activity which is marked as tradable in the Schedule Manager trade configuration. A Schedule Manager may be a core application in a scheduling system. The Schedule Manager may be responsible for storing and retrieving schedule data, net staffing data, and all configurations required to generate schedules including daily rules, weekly rules, and activity codes.

Figure 3:
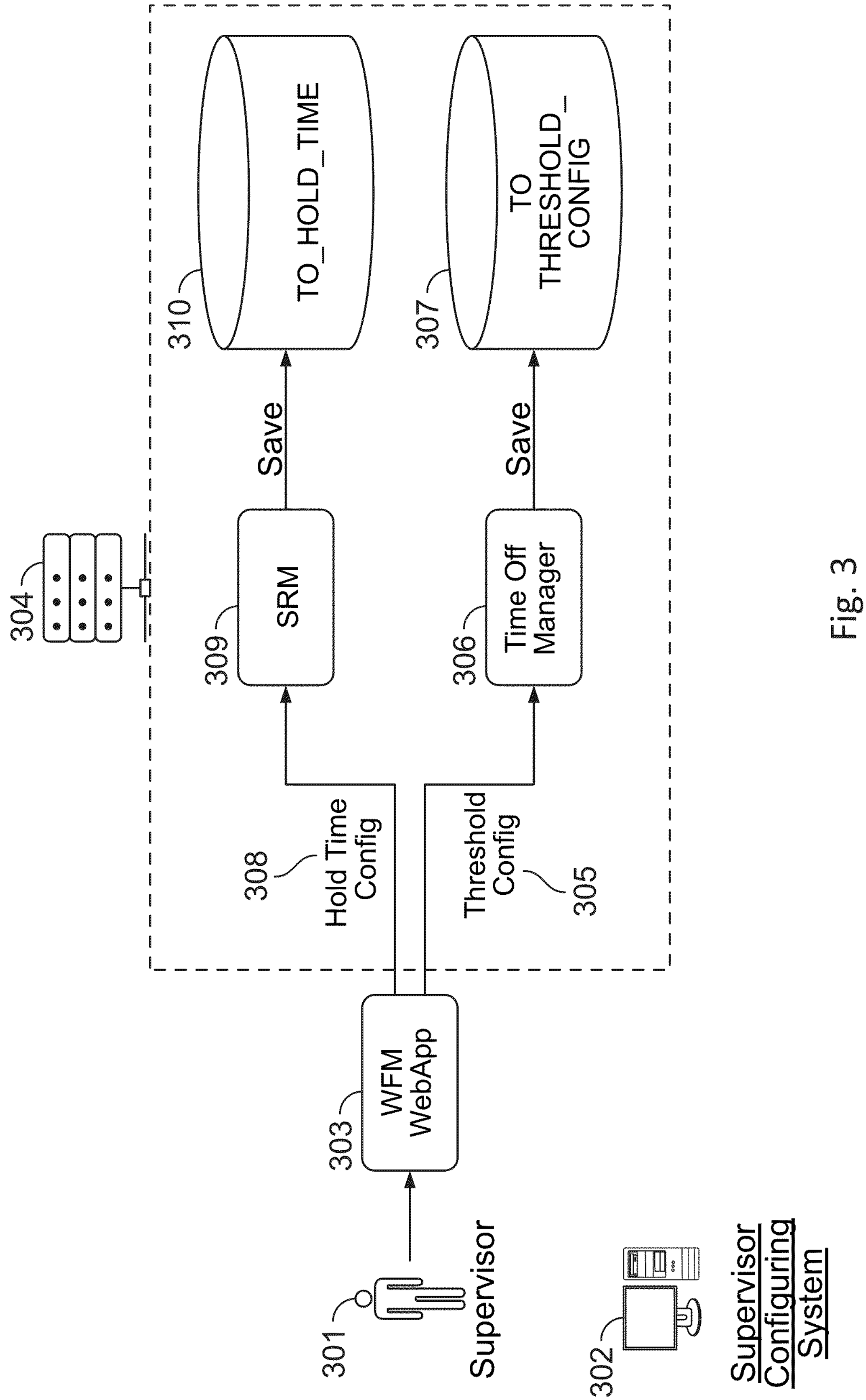
FIG. 3 shows a flowchart of how criteria may be predefined, according to some embodiments of the invention.

FIG. 3 shows a flowchart of how criteria may be predefined, according to some embodiments of the invention. A supervisor or manager 301 may provide input to a terminal 302 to access and edit a WFM application 303 such as a web app. WFM application 303 may be hosted, executed, or carried out by a server 304. Terminal 302 and server 304 may be connected via a network, which may be a wired network or a wireless network (such as the internet). Supervisor 301 may use terminal 302 to view and interact with a user interface of WFM application 303.

Supervisor 301 using terminal 302 may define, a threshold configuration 305 which may be used by a time off manager 306 (which may be a microservice). The threshold configuration 305 may be a time-off criterion as discussed herein, and may configure a specified threshold of time-offs and/or period before notifying agents. Threshold configuration/time-off criterion 305 may be saved (e.g. stored) in a digital storage 307. Digital storage 307 may be a storage 130 as described in FIG. 1, and may be a dedicated storage or portion of storage. In FIG. 3, threshold configurations are shown as being saved in a digital storage 307 labelled as TO_THRESHOLD_CONFIG, e.g. time-off threshold configuration data storage.

Supervisor 301 using terminal 302 may define, a hold-time configuration 308 which may be used by a schedule request manager "SRM" 309 (which may be a microservice) to hold, or delay approval of requests, e.g. hold-time configuration 308 may be a delay duration as discussed herein, and may configure a specified amount of time before initiating an approval process of a time-off request. Hold-time configuration/delay duration 308 may be saved (e.g. stored) in a digital storage 310. Digital storage 310 may be a storage 130 as described in FIG. 1, and may be a dedicated storage or portion of storage. Digital storage 310 may be the same as, or may occupy a portion on, digital storage 307. In FIG. 3, hold-time configurations are shown as being saved in a digital storage 310 labelled as TO_HOLD_TIME, e.g. time-off hold-time data storage.

Figure 4A:
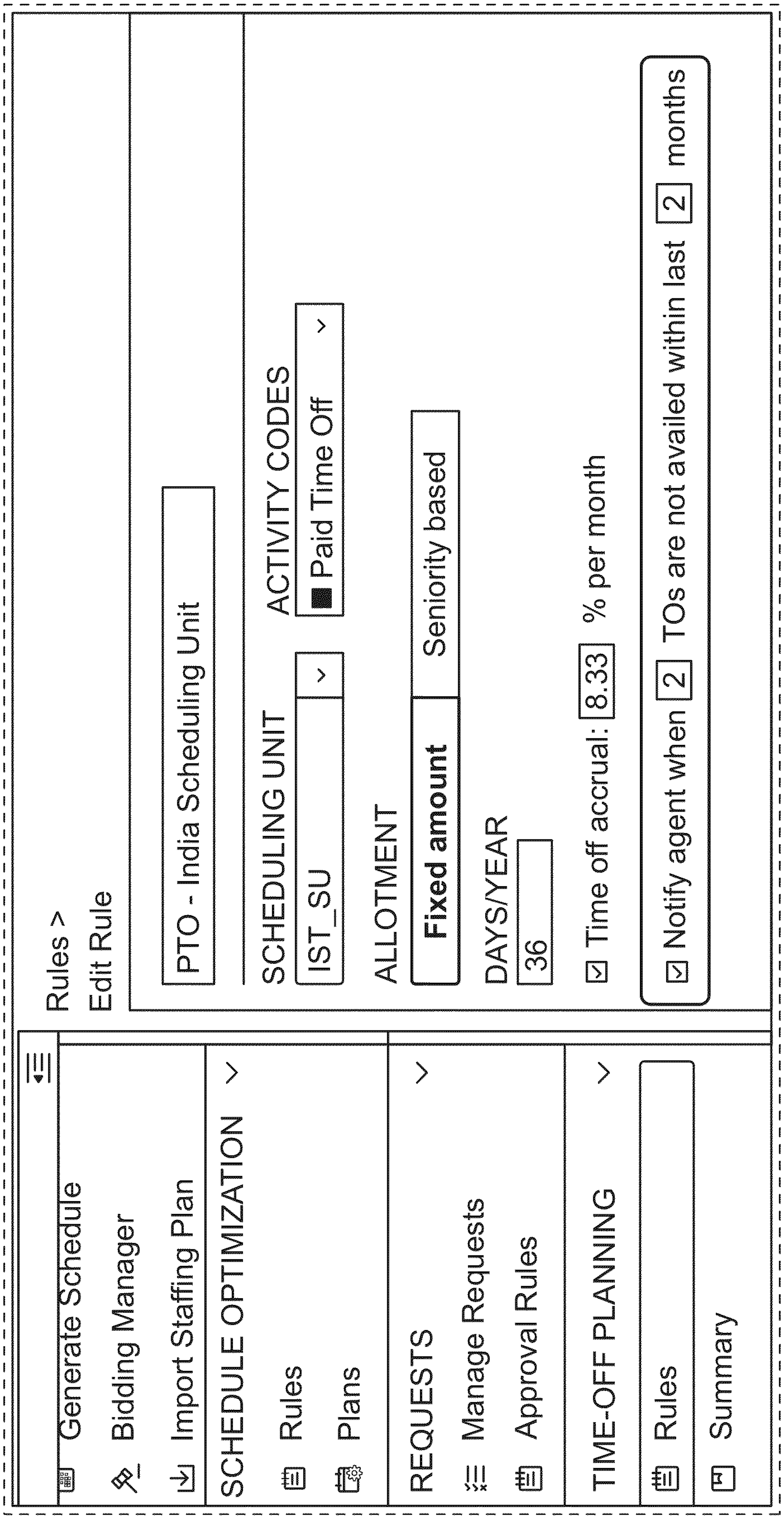
FIGS. 4A and 4B show example user interfaces, according to embodiments of the invention.
Figure 4B:
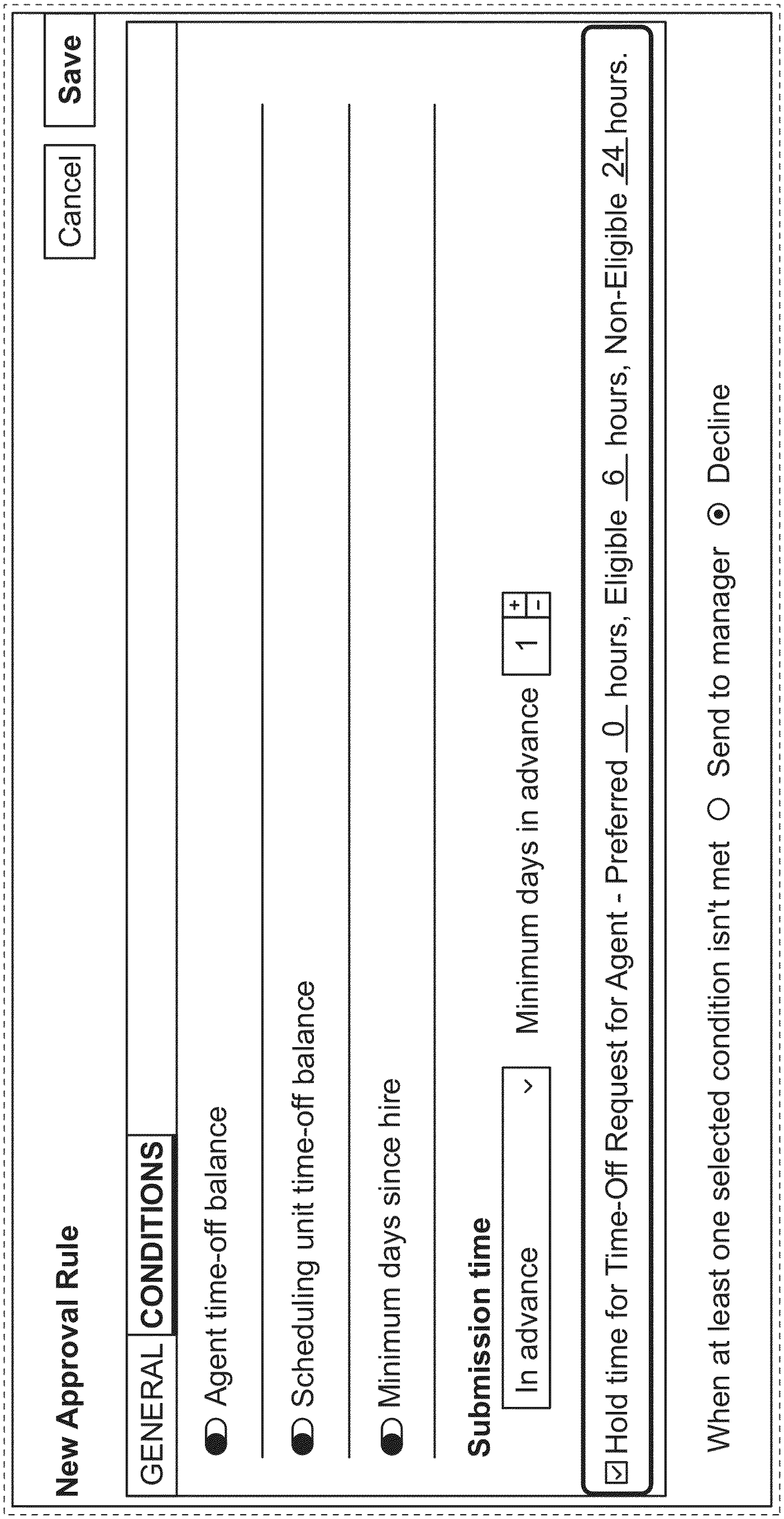

FIGS. 4A and 4B show example user interfaces, according to embodiments of the invention. Supervisor 301 may edit one or more rules for a scheduling unit, for example by specifying a number of days of paid time off per year (e.g. shown in FIG. 4A as 36), specifying a rate of accrual of time off (e.g. shown as 8.33% per month) and/or specifying the threshold configuration or time-off criterion of when to notify agents after a specified number of time-offs (e.g. TOs) are not taken in a specified period of time (e.g. when 2 TOs are not availed within the last 2 months).

Supervisor 301 can edit the hold-time configuration/delay duration using a user interface as shown in FIG. 4B, which in the example shown is set as 0 hours for preferred agents, 6 hours for eligible agents, and 24 hours for non-eligible agents.

Figure 5:
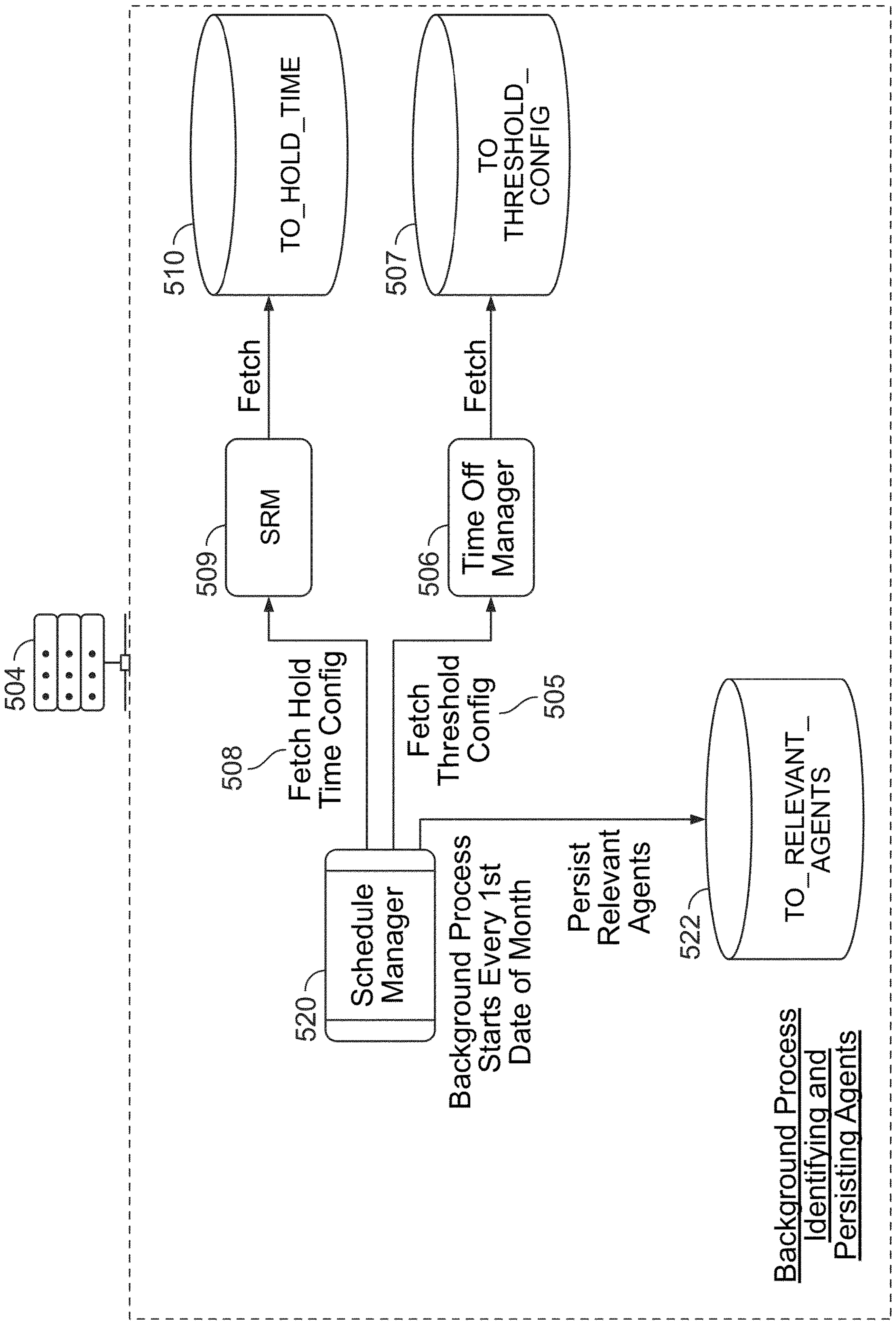
FIG. 5 shows a flowchart, according to some embodiments of the invention.

FIG. 5 shows a flowchart, according to some embodiments of the invention. Server 504 (which may be, or may include one or more components of, a computing device as shown in FIG. 1) may execute, operate, or otherwise carry out a schedule manager microservice 520. As an example, a background process for periodically (e.g. regularly, or irregularly) determining the set of agents which satisfy the predefined time-off criterion may be started every first date of the month, e.g. $1^{st}$ January, $1^{st}$ February, $1^{st}$ March etc. Other dates may be used, and different frequencies or periodicities may be used (e.g. every two months, every 3 weeks, etc.). The set of determined agents 521, which may be referred to as relevant agents, may be stored in a data storage 522. Schedule manager 520 may fetch hold-time configuration 508 from data storage 510, for example by way of SRM 509, and may fetch threshold configuration 505 from data storage 507, for example by way of time off manager 506.

Figure 6:
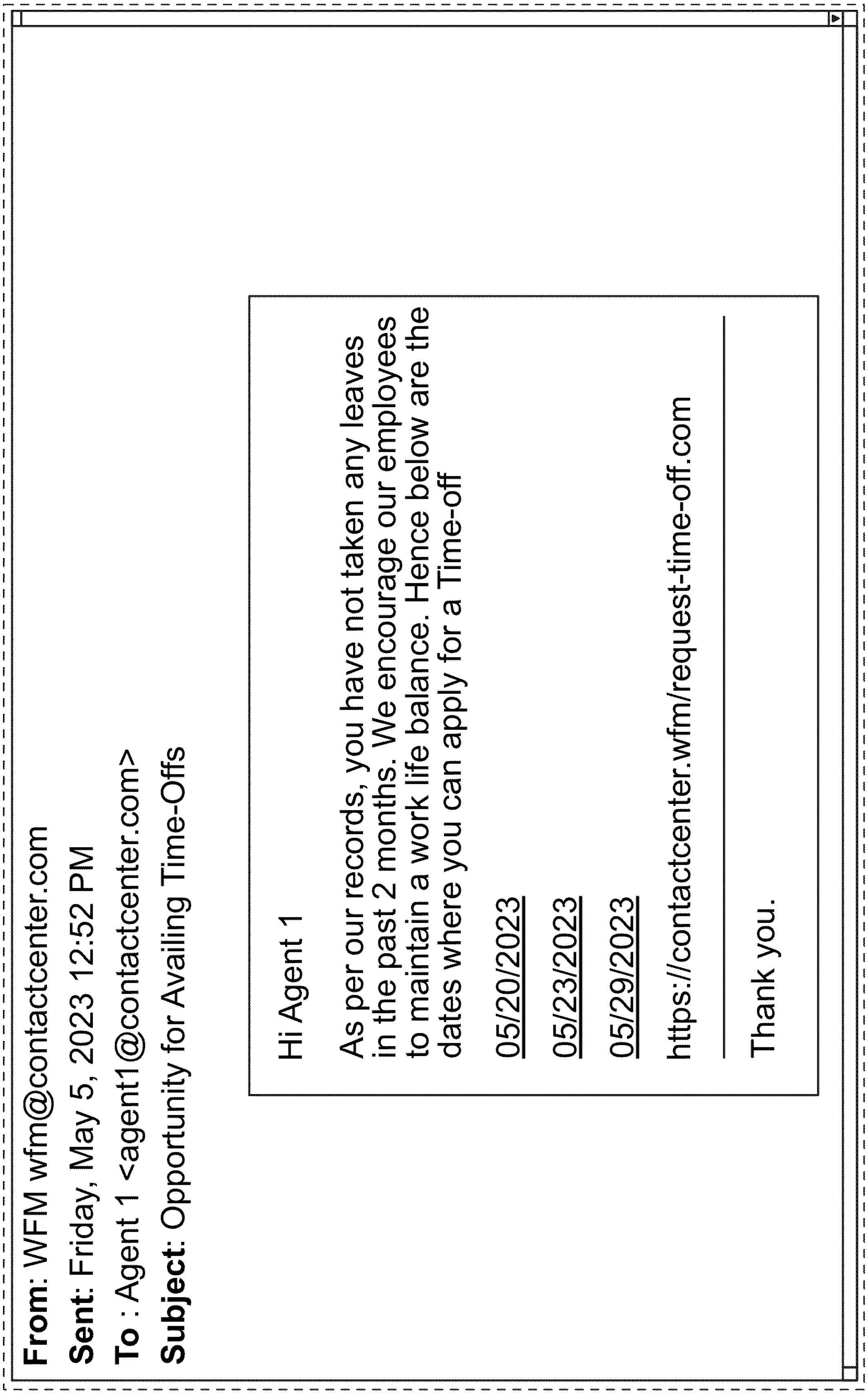
FIG. 6 shows an example digital message which may be sent, according to embodiments of the invention.

FIG. 6 shows an example digital message which may be sent, according to embodiments of the invention. The digital message used to notify the determined agents (e.g. set of determined agents 521 as shown in FIG. 5) may be an email, as shown. The email of FIG. 6 shows a list of recommended dates, which may include hyperlinks to an application such as a web app for requesting a time off.

FIG. 7 shows an example flowchart according to some embodiments of the invention. An agent 731 may use a terminal, such as an agent terminal 732 to initiate a time-off (TO) request. For example, agent 731 may have received a digital message such as shown in FIG. 6 with a recommended list of dates on which to take a time-off, because agent 731 may have been determined not to have taken a preferred number of time offs in a given time period (e.g. not taken two time-offs in the last two months). Agent 731 may interact with the digital message, for example following a link by providing input to their agent terminal 732 to click on a suggested date, which may open, start, or otherwise initiate a time-off request on a web application or other platform such as the My Zone web app provided by NICE LTD. The web application is shown in FIG. 7 labelled as 733. Web application 733 may be hosted, executed, or carried out by a server 704. Terminal 732 and server 704 may be connected via a network, which may be a wired network or a wireless network (such as the internet). Agent 731 may use terminal 732 to view and interact with a user interface of web application 733.

Agent 731 may use terminal 732 to create, populate, or otherwise complete a time-off request on web application 733. Web application 733 may send details of a submitted time-off request to a schedule request manager 709, which may be a microservice as discussed herein. Schedule request manager 709 may fetch a list of relevant agents (e.g. agents which satisfy the time-off criterion/threshold configuration) from data storage 722.

Schedule request manager 709 may approve or decline (e.g. reject) the time-off request as described herein. For example, SRM 709 may delay the approval process for a predetermined period of time (e.g. hold time) based on a classification of agent 731 in the list of determined relevant agents. For example: SRM 709 may immediately and automatically approve the time-off request from agent 731 if agent 731 is a preferred agent as discussed herein; SRM 709 may delay the approval process for a predetermined period of time such as 6 hours if agent 731 is an eligible agent as discussed herein; or SRM 709 may delay the approval process for a predetermined period of time such as 24 hours (e.g. a duration greater than for eligible agents) if agent 731 is a non-eligible agent as discussed herein.

Once a decision on the request has been made (e.g. automatically by SRM 709, or by a supervisor providing input to a terminal) the response may be sent to agent 731. For example, if the approval process resulted in approval of the time-off request, agent 731 may be notified that the time-off request was accepted. If the approval process resulted in rejection of the time-off request, agent 731 may be notified that the time-off request was declined: a status of the agent may be changed, for example by schedule manager microservice 520, from eligible to preferred in such an instance, due to the rejected time-off request.

Figure 8:
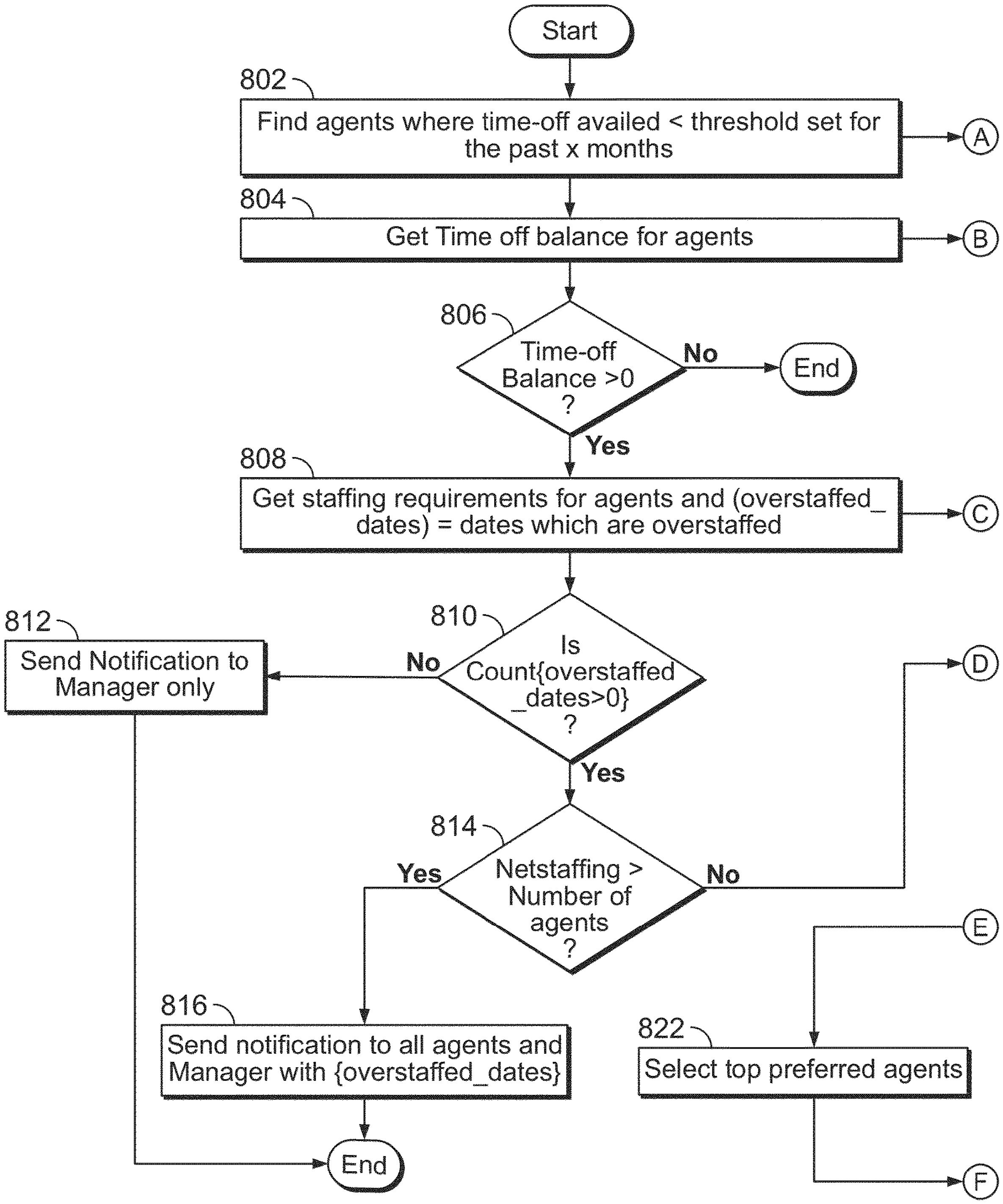
FIG. 8 shows a flowchart, according to some embodiments of the invention.
Figure 8:
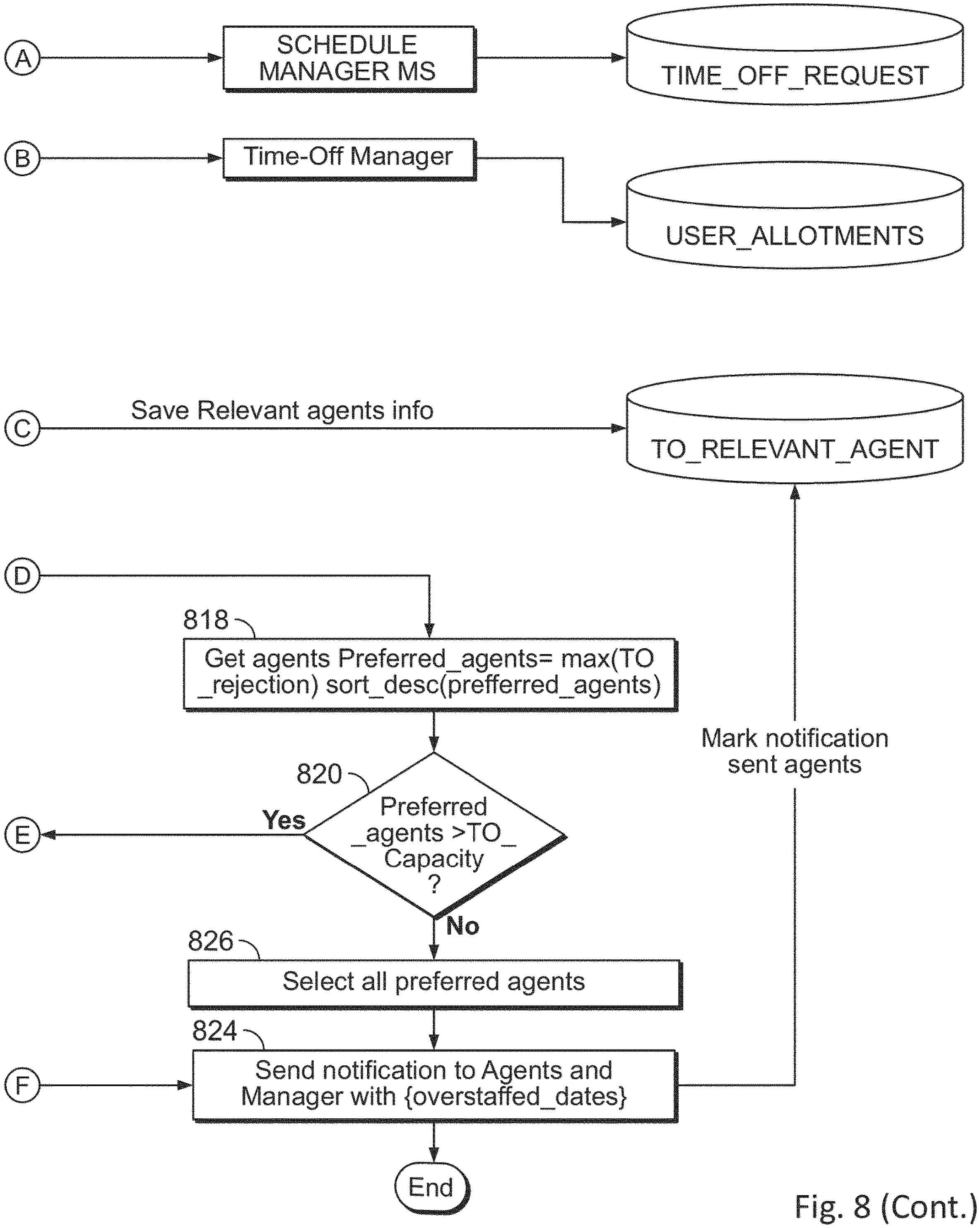

FIG. 8 shows a flowchart according to some embodiments of the invention. For example, a system according to some embodiments of the invention may implement, execute, or otherwise perform one or more steps as shown in FIG. 8. At Step 802, some embodiments of the invention may find agents where time-off availed (e.g. taken) is less than a threshold set for the past X months (e.g. the time-off criterion or threshold configuration discussed herein, for example two time-offs in the last two months). Some embodiments of the invention may do this by requesting data from a schedule manager microservice (e.g. as discussed herein), which may fetch or otherwise retrieve the requested data from a data storage, such as a data storage or portion of a data storage storing TIME_OFF_REQUEST data.

At Step 804, some embodiments of the invention may get a time-off balance for the agents (e.g. the agents found/determined at Step 802). Some embodiments of the invention may do this by requesting data from a time-off manager (which may be a microservice), which may fetch or otherwise retrieve the requested data from a data storage, such as a data storage or portion of a data storage storing USER_ALLOTMENTS data.

At Step 806, some embodiments of the invention may check (e.g. as part of a decision process using logical operators), for example for each agent, if a time-off balance is greater than zero. For example, some embodiments of the invention may check that agents have remaining time-off allowance to use before recommending the agent should take a time-off. If the outcome of Step 806 is No for a particular agent, some embodiments of the invention may end the process for that agent (e.g. the agent will be removed from a list or otherwise removed from consideration).

If the outcome of Step 806 is Yes, some embodiments of the invention may proceed to Step 808 for those agents with a time-off balance greater than zero.

At Step 808, some embodiments of the invention may save the list or set of determined relevant agents to a data storage. Some embodiments of the invention may also get staffing requirement data for the relevant agents, and also retrieve a list of over-staffed dates. Overstaffed dates may be dates where there are more staff than necessary for the predicted volume of work for that date.

At Step 810, some embodiments of the invention may check (e.g. as part of a decision process using logical operators) if there are any (e.g. more than zero) overstaffed dates.

Figure 9:
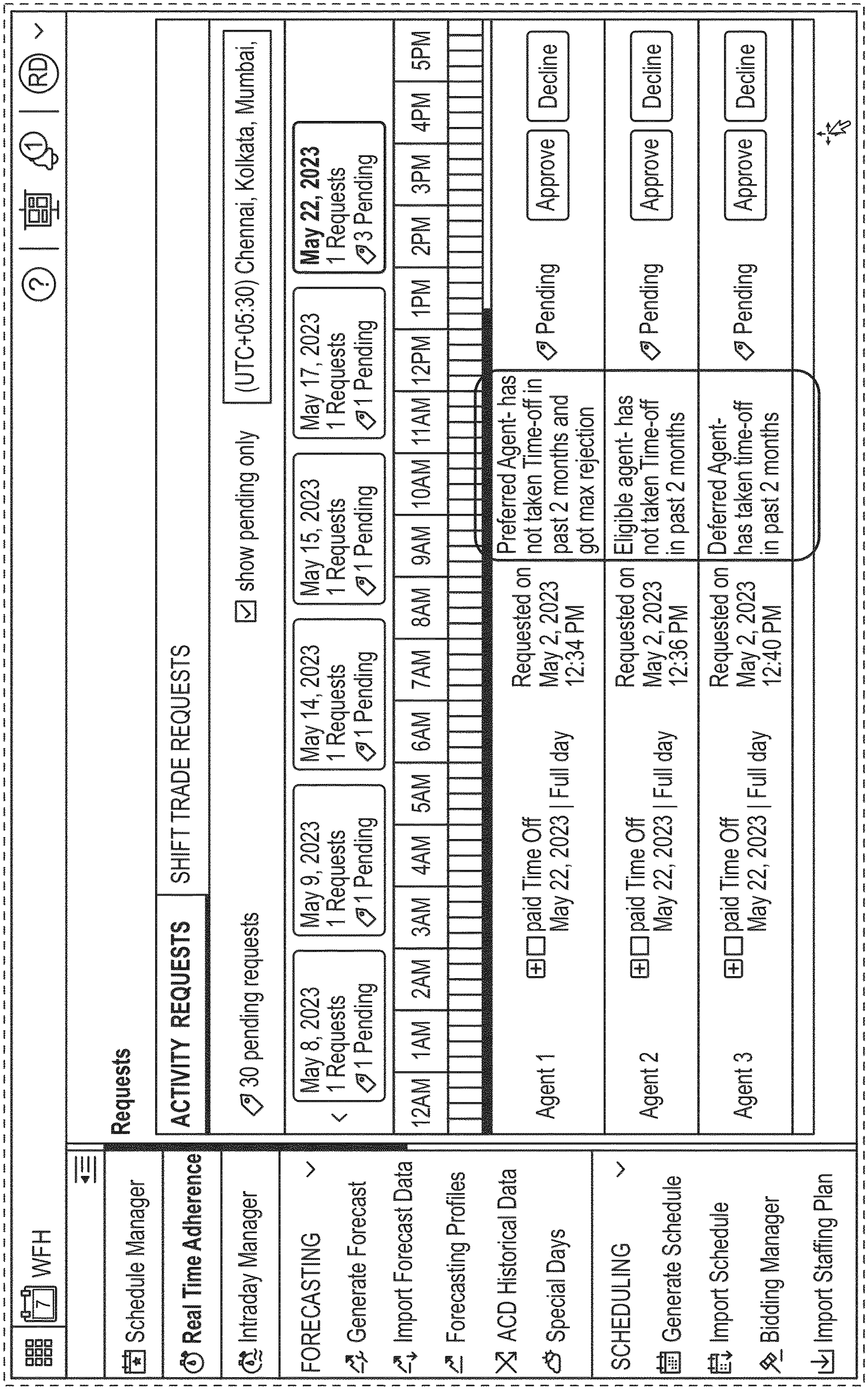
FIG. 9 shows an example user interface, according to some embodiments of the invention.

If No, and there are zero overstaffed dates, embodiments may send a notification only to a manager at Step 812. For example, because a time-off on dates with no over-staffing would result in an understaffing on those dates, notifying only the manager with the list of relevant agents may assist the manager in approving any unprompted (e.g. manual) requests for time-off made by any of the agents. FIG. 9 shows an example user interface according to some embodiments of the invention. The manager may view and interact with the user interface using a terminal, and the user interface may show a message or other indication which identifies a status classification of an agent requesting a time off, such as a preferred status, an eligible status, and/or a non-eligible (e.g. deferred) status as described herein. Returning to FIG. 8, the process may end after Step 812.

If at Step 810 the decision process results in a Yes, e.g. there are some overstaffed dates, some embodiments of the invention may proceed to a decision process at Step 814, whereby some embodiments of the invention may check if net staffing is greater than the number of relevant agents.

If the outcome of Step 814 is Yes, and the net staffing is greater than the number of relevant agents, some embodiments of the invention may send a notification to all relevant agents (and may also send to managers) a list of overstaffed dates with a recommendation to take a time-off as Step 816. The process may then end.

If the outcome of Step 814 is No, and the nets staffing is not greater than the number of relevant agents, some embodiments of the invention may, as a Step 818, get the number of preferred agents (e.g. those agents with rejected time-off in the past X months). For example, some embodiments of the invention may sort or filter the list of relevant agents to produce a list of preferred agents (e.g. agents which are not preferred agents may be discarded or removed from the list).

At Step 820, some embodiments of the invention may use a decision process to determine if the number of preferred agents is greater than the time-off capacity (e.g. the number of overstaffed dates).

If the outcome at Step 820 is Yes, then only the top preferred agents may be selected to receive a notification of the overstaffed dates on which to take a time-off (see Steps 822 and 824). Preferred agents may be sorted to identify "top" preferred agents, for example the preferred agents may be sorted according to number of time-off rejections, performance score, or other data.

If the outcome at Step 820 is No, and there is more time-off capacity than preferred agents, then some embodiments of the invention may select all of the preferred agents to receive a notification of the overstaffed dates on which to take a time-off (see Steps 826 and 824). Some embodiments of the invention may record if a notification was sent to relevant agents, for example storing this as a data value, flag, or other indication in the agent profile data in the data storage of relevant agents. The process may then end.

Figure 10:
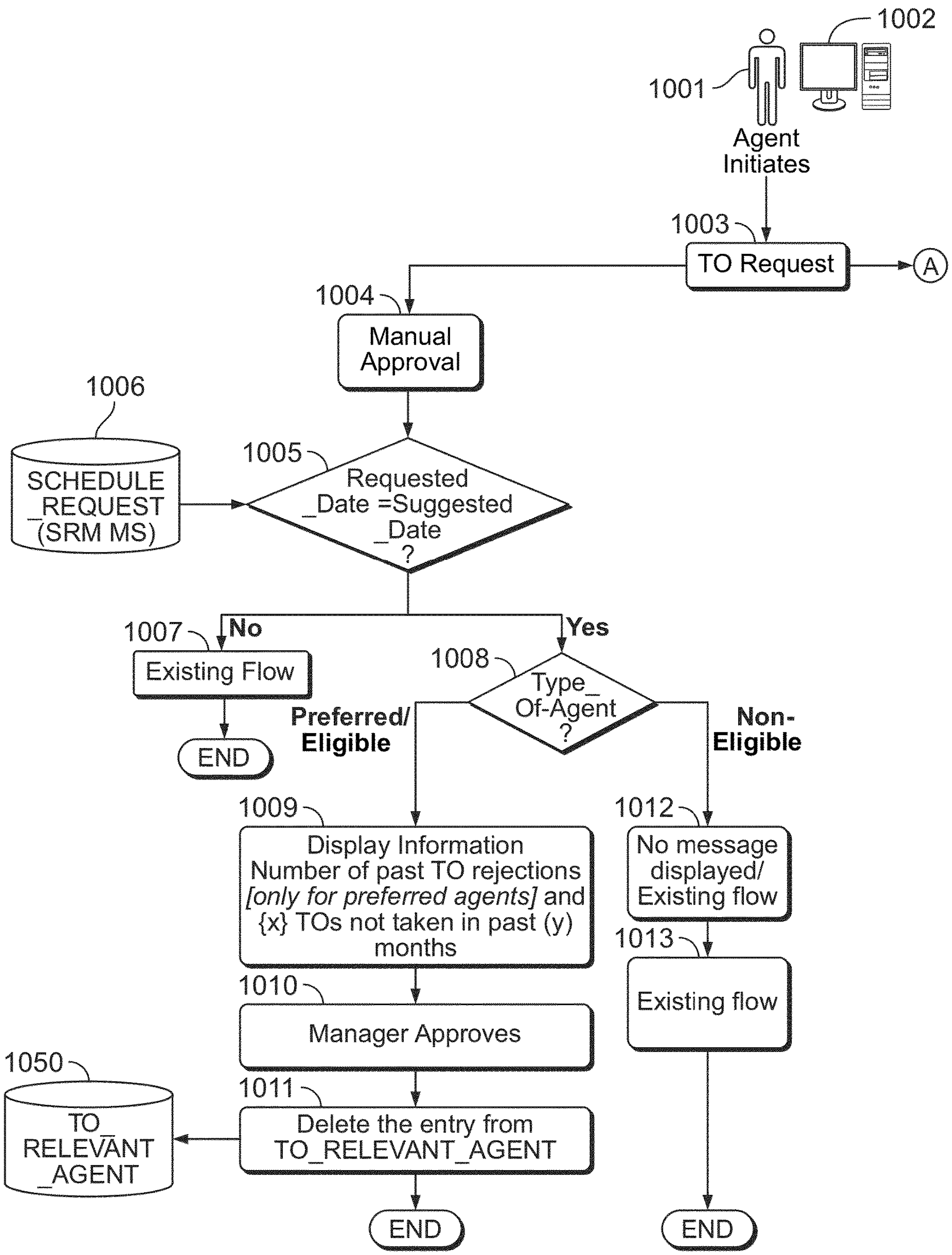
FIG. 10 shows an example flowchart, according to some embodiments of the invention.
Figure 10:
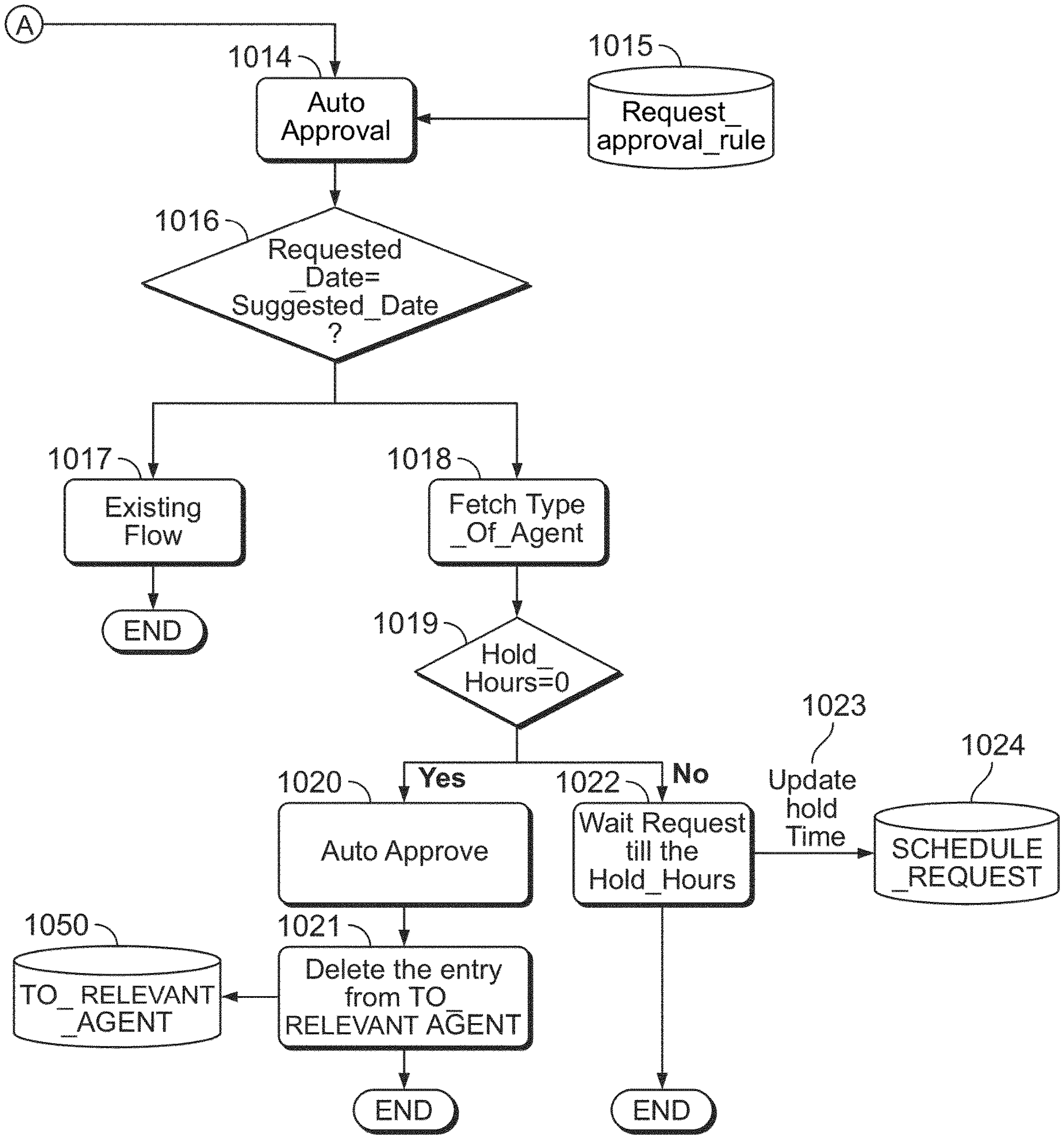

FIG. 10 shows an example flowchart according to some embodiments of the invention. A system according to some embodiments of the invention may carry out one or more steps of FIG. 10.

An agent 1001 may use a terminal, such as an agent terminal 1002, to request a time-off 1003. Requesting a time-off may be as described herein, and may include providing input to a terminal interacting with a web application or other platform for requesting time-off.

In embodiments of the invention which include a manual approval process 1004, embodiments of the invention may use a decision process 1005 to determine if the requested date (e.g. the date requested for time-off) is the same as (e.g. ==) a suggested date which was recommended to agents via the notifying digital message discussed herein. As part of the determination, embodiments of the invention may use data about recommended/suggested dates from a data storage 1006 of a schedule request manager microservice.

If the outcome of Step 1005 is No, and the requested date is not one of the suggested dates, embodiments of the invention may send the request to be processed using an existing flow 1007 of an existing WFM system. Embodiments of the invention may then stop processing the time-off request and end.

If the outcome at Step 1005 is Yes, and the requested date is the same as one of the suggested dates, embodiments of the invention may use a decision process 1008 to determine how to handle time-off requests from different types of agent. The agent type may be as discussed herein, for example preferable, eligible, and non-eligible.

If the agent is a preferred or eligible agent, embodiments of the invention may display (e.g. on a terminal of a manager) at Step 1009 information on past time-off rejections (e.g. for the preferred agents) and the number X of time-offs not taken in the past Y months according to the time-off criterion/threshold configuration (e.g. for both preferred and eligible agents). FIG. 9 shows an example of the information which may be displayed to manager on a terminal running the web application user interface. A manager may use a terminal to approve the request at 1010, and embodiments of the invention may delete 1011 the agent from the list of relevant agents stored in a data storage, such as data storage 1050 of relevant agents. Embodiments of the invention may then end the process.

If the agent is a non-eligible agent, embodiments of the invention may not display a message on a terminal of a manager, see 1012. In some embodiments a message such as shown in FIG. 9 may be displayed, indicating that the agent has taken time-off recently. Embodiments of the invention may send the request to be processed using an existing flow 1013 of an existing WFM system, which may be the same as, or may be similar to, existing flow 1007. Embodiments of the invention may then stop processing the time-off request and end.

In embodiments of the invention which include an automatic approval process 1014, embodiments of the invention may request one or more approval rules from a data storage 1015.

At 1016, embodiments of the invention may use a decision process to determine if the requested date (e.g. the date requested for time-off) is the same as (e.g. ==) a suggested date which was recommended to agents via the notifying digital message discussed herein. Decision process 1016 may be the same as, or may be similar to, decision process 1005 discussed herein.

If the outcome of Step 1016 is No, and the requested date is not one of the suggested dates, embodiments of the invention may send the request to be processed using an existing flow 1017 of an existing WFM system, which may be the same as, or may be similar to, existing flow 1007. Embodiments of the invention may then stop processing the time-off request and end.

If the outcome of Step 1016 is Yes, and the requested date is the same as one of the suggested dates, embodiments of the invention may fetch the agent type 1018. At 1019, embodiments of the invention may check the hold time for the agent. For example, embodiments of the invention may check if the hold time is 0 hours.

If the outcome of 1019 is Yes, and the hold-time for the agent is 0 hours, embodiments of the invention may automatically approve the time-off request at 1020. Embodiments of the invention may delete 1021 the agent from the list of relevant agents stored in a data storage, such as data storage 1050 of relevant agents. Embodiments of the invention may then end the process.

If the outcome of Step 1019 is No, and the hold-time for the agent is not 0 hours, embodiments of the invention may hold 1022 the request until the hold-time has expired. Embodiments of the invention may then update 1023 the hold-time to equal zero once the hold-time has elapsed, e.g. by updating the hold-time in a data storage 1024 of the schedule request manager microservice. Embodiments of the invention may then process the time-off request from Step 1019, and because the hold-time is now equal to zero, the time-off request may be automatically approved as discussed with respect to Step 1020.

Figure 11:
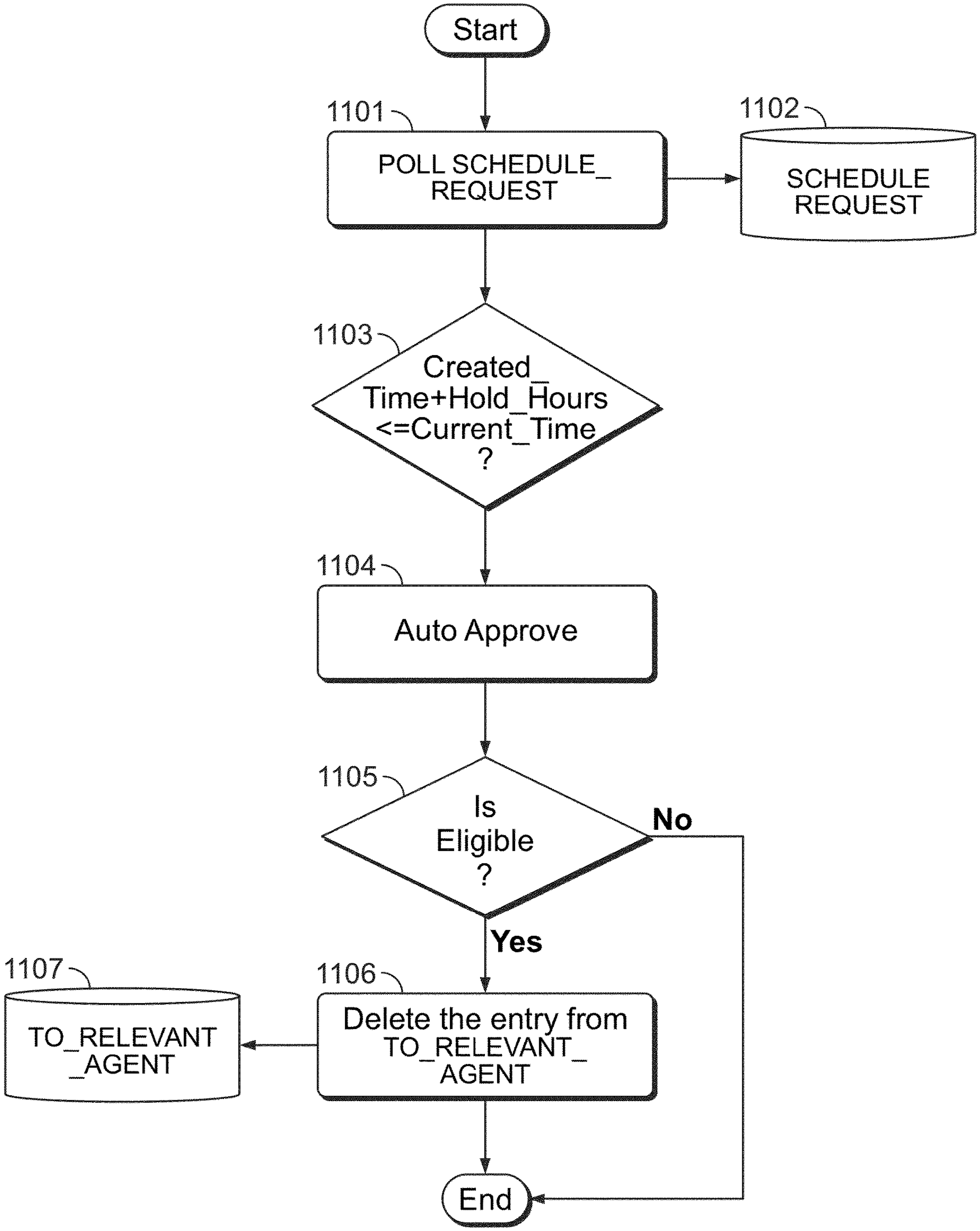
FIG. 11 shows an example flowchart, according to some embodiments of the invention.

FIG. 11 shows an example flowchart according to some embodiments of the invention. A system according to some embodiments of the invention may carry out one or more steps of FIG. 11, for example when determining and waiting until a hold-time has elapsed.

An embodiment may poll or otherwise query a schedule request manager microservice 1102 as a step 1101. The poll may relate 1103 to whether a time a time-off request was created (e.g. based on a timestamp, or request ID) plus the hold-time is less than or equal to the current time. For example, a time-off request submitted five hours ago requiring a hold-time of 6 hours (e.g. because the agent is only an eligible agent and not a preferred agent) must sill be held or delayed from processing for at least another hour because the 6 hour hold time has not yet fully elapsed.

If the hold-time has elapsed, embodiments of the invention may auto-approve the time-off request at 1104.

Embodiments of the invention may use a decision process 1105 to check if the agent is an eligible agent. If the agent is not an eligible agent, (e.g. they were a non-eligible agent) the process may end. If the agent was an eligible agent, embodiments of the invention may delete 1106 the agent from the list of relevant agents stored in a data storage 1107 before ending the process. Removing the agent form the list may ensure that agents who have already had their time-off requests auto-approved are not considered for future auto-approval cycles within the current cycle period. The auto approval process may run as a background process every hour. This frequency may allow for regular checks on held time-off requests and may ensure timely auto-approval for eligible requests. Other frequencies may be used.

Table 1 shows example data structures of some of the data described herein;

TABLE 1

```
TimeOffRule {
  String ruleId;
  String ruleName;
  String allotmentType;
  Double allottedDays;
  String scheduling UnitId;
  schedulingUnitName;
  String activityCodeId;
  String activityCodeName;
  String accrualType;
  Double accrualValue;
  boolean allowCarryOver;
  Double carryOverDays;
  Integer timeOffsNotTakenThreshold;
  Integer timeOffNotTakenMonthsThreshold;
}
AutoApprovalRule {
  String ruleName;
  List<IdNamePair> schedulingUnits;
  List<IdNamePair> activityCodes;
  RequestApprovalRuleConditions ruleConditions;
  boolean isAutoDecline;
  String status;
}
RequestApprovalRuleConditions {
  Integer daysInAdvance;
  Integer daysInPast;
  Integer daysInFuture;
  Integer minimumAgentSeniorityInDays;
  boolean isAgentBalanceRequired;
  boolean isAutoApproveOnAllDays;
  Boolean isGroupAllotmentRequired;
  Integer preferredAgentThreshold;
  Integer eligibleAgentThreshold;
  Integer nonEligibleAgentThreshold;
  }
```

The present invention may be embodied as a non-transitory computer readable storage medium containing instruction which, when executed by at least one processor in a computing device (such as computing device 100 of FIG. 1), cause the at least one processor to carry out methods as described herein.

The present invention may also be embodied as a system, for example a system which includes at least one processor; and a computer readable storage medium containing instructions which, when executed by the at least one processor, cause the at least one processor to carry out one or more methods and/or process described herein.

For example, embodiments of the invention may be carried out by a computing device as shown in FIG. 1, integrated into an existing WFM architecture, or operating a new WFM architecture. The at least one processor may: periodically determine a set of agents who satisfy a predefined time-off criterion; and notify at least some agents of the determined set of agents of a recommended list of dates on which to take a time-off, wherein the recommended list of dates is generated by the at least one computer processor in accordance with staffing prediction data for said dates.

According to some embodiments of the invention there is also provided a method and/or system for prioritizing time-off requests in a digital schedule. For example, as discussed herein, time-off requests from preferred agents may be prioritized over time-off requests from eligible agents, which may be prioritized over time-off requests from non-eligible agents. Methods and/or systems according to such embodiments of the invention may include (for example, using a computer processor): identifying one or more agent profiles which satisfy a predefined schedule criterion (such as a threshold configuration discussed herein of number X of time-offs not taken in the last Y months); and sending, to at least one agent corresponding to the identified one or more agent profiles, one or more time periods on which to take a time-off, wherein the recommended list of time periods is generated in accordance with staffing prediction data for the time periods. For example, agents who have not taken 2 time-offs in the last two months may be identified as satisfying a predefined schedule condition and may accordingly be sent one or more time periods (e.g. dates, shifts) on which to take a time-off.

Some embodiments of the invention may include grouping (e.g. classifying) the identified one or more agents into one or more subgroups based on a time-off history of the identified one or more agents. For example, as discussed herein, preferred agents who have not recently taken a time-off and who have had time-offs rejected may be grouped into a first sub-group, eligible agents who have not recently requested time-offs may be grouped into a second subgroup, and non-eligible agents who have recently taken a time-off may be grouped into a third subgroup. As such, the first subgroup may include agents with a greater number of rejected time-offs than agents of the second or third subgroup. Some embodiments of the invention may prioritize a processing of a time-off request submitted by one of the identified one or more agents based on a subgroup thereof. For example, some embodiments of the invention may prioritize time-off requests from preferred agents.

As discussed herein, the prioritizing may include approving or rejecting a time-off request submitted by an agent belonging to a first subgroup, and approving or rejecting a time-off requested submitted by a different agent belonging to a second subgroup after a predetermined time. For example, a time-off request from a preferred agent may be approved immediately, whereas a time-off request from an eligible agent may only be approved or rejected after 6 hours.

In some embodiments, the prioritizing may further include approving or rejecting a time-off request submitted by an agent which does not satisfy the predefined schedule criterion only after approving or rejecting any requests from agents belonging to the first or second subgroups. For example, a non-eligible agent as discussed herein may not have a time-off request approved until time of requests from preferred or eligible agents have been processed. The predefined schedule criterion may include a first number of time-offs not taken within a second number of months, for example as discussed a number X of time-offs (e.g. 2) not taken within the last number Y of months (e.g. 2) may be a threshold configuration for determining which agents to notify about taking a time-off.

Embodiments of the invention may improve WFM technologies, trend analysis, and machine-automation.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, “processing,” “computing,” “calculating,” “determining,” “establishing”, “analyzing”, “checking”, or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for digital scheduling, the method comprising, using a computer processor:

periodically determining, from a datastore of agent profiles, a set of agents which satisfy a predefined time-off criterion using a schedule request manager microservice operated by a computer server and storing and retrieving schedule data;

notifying, via a digital message, one or more agents of the determined set of agents of a recommended list of dates on which to take a time-off, prompting, via the digital message, the one or more agents a user Interface window, wherein the user Interface window includes a clickable hyperlink navigates to a web application allowing the one or more agents to interact with the clickable hyperlink and initiate an approval process of a time-off request;

wherein the recommended list of dates is generated in accordance with staffing prediction data for the dates;

classifying the determined set of agents into at least two subsets in accordance with historic time-off data; and prioritising an approval of a time-off request submitted to an agent terminal computer device using a time-off request platform and the schedule request manager microservice by an agent of a first subset of the at least two subsets over an approval of a time-off request submitted to the agent terminal computer device using the time-off request platform and the schedule request manager microservice by an agent of a second subset of the at least two subsets, wherein the prioritising comprises:

saving, by the schedule request manager microservice, relevant agents information including information of the agents of the first and second subsets to a database;

defining a hold-time configuration used by the schedule request manager microservice to hold or delay approval of time-off requests, and saving the hold-time configuration in a digital storage;

initiating the approval process of the time-off request submitted by the agent of the first subset;

delaying, via the schedule request manager microservice, initiation of the approval process for the time-off request submitted by the agent of the second subset by holding the time-off request in a hold state and making the time-off request wait in the hold state until hold hours defined by the hold-time configuration have expired;

automatically approving the time-off request submitted by the agent of the second subset by the schedule request manager microservice in response to determining that the hold-time has elapsed and is equal to zero; and upon approval of the time-off request submitted by the agent of the second subset, updating the database by deleting the information of the agent of the second subset, wherein the schedule request manager microservice executes an automated approval workflow that performs the saving, holding, monitoring, delaying, approving, and database updating without manual intervention, thereby reducing concurrent processing conflicts of the time-off requests and improving utilization of staffing resources within a digital scheduling system.

2. The method of claim 1, wherein an agent satisfies the predefined time-off criterion if the agent has not taken a predefined number of time-offs within a predefined time period.

3. The method of claim 1, wherein the recommended list of dates notified to a first agent of the determined set of agents is different to a recommended list of dates notified to a second agent of the determined set of agents.

4. The method of claim 1, further comprising delaying initiation of the approval process for a time-off request submitted by an agent who does not satisfy the predefined time-off criterion for a predefined third duration greater than the hold-time defined in the hold-time configuration.

5. The method of claim 1, wherein the first subset comprises agents with a greater number of rejected time-offs than agents of the second subset.

6. A system for digital scheduling, the system comprising: at least one computer processor; and a computer readable storage medium comprising instructions which, when executed by the at least one computer processor, cause the at least one computer processor to:

periodically determine a set of agents which satisfy a predefined time-off criterion using a schedule request manager microservice operated by a computer server and storing and retrieving schedule data;

notify, via a digital message, at least some agents of the determined set of agents of a recommended list of dates on which to take a time-off, prompt, via the digital message, the at least some agents a user Interface window, wherein the user Interface window includes a clickable hyperlink navigates to a web application allowing the at least some agents to interact with the clickable hyperlink and initiate an approval process of a time-off request;

wherein the recommended list of dates is generated by the at least one computer processor in accordance with staffing prediction data for said dates;

classify the determined set of agents into at least two subsets in accordance with historic time-off data; and prioritise an approval of a time-off request submitted to an agent terminal computer device using a time-off request platform and the schedule request manager microservice by an agent of a first subset of the at least two subsets over an approval of a time-off request submitted to the agent terminal computer device using the time-off request platform and the schedule request manager microservice by an agent of a second subset of the at least two subsets, wherein the at least one computer processor is configured to prioritise the approval of the time-off request submitted by the agent of the first subset by being configured to:

save, by the schedule request manager microservice, relevant agents information including information of the agents of the first and second subsets to a database;

define a hold-time configuration used by the schedule request manager microservice to hold or delay approval of time-off requests, and save the hold-time configuration in a digital storage;

initiate the approval process of the time-off request submitted by the agent of the first subset;

delay, via the schedule request manager microservice, initiation of the approval process for the time-off request submitted by the agent of the second subset, by holding the time-off request in a hold state and making the time-off request wait in the hold state until hold hours defined by the hold-time configuration have expired;

automatically approve the time-off request submitted by the agent of the second subset by the schedule request manager microservice in response to a determination that the hold-time has elapsed and is equal to zero; and upon approval of the time-off request submitted by the agent of the second subset, update the database by deleting the information of the agent of the second subset, wherein the schedule request manager microservice executes an automated approval workflow that performs the saving, holding, monitoring, delaying, approving, and database updating without manual intervention, thereby reducing concurrent processing conflicts of the time-off requests and improving utilization of staffing resources within the system.

7. The system of claim 6, wherein an agent satisfies the predefined time-off criterion if the agent has not taken a predefined number of time-offs within a predefined time period.

8. The system of claim 6, wherein the recommended list of dates notified to a first agent of the determined set of agents is different to a recommended list of dates notified to a second agent of the determined set of agents.

9. The system of claim 6, wherein the at least one computer processor is further configured to delay initiation of the approval process for a time-off request submitted by an agent who does not satisfy the predefined time-off criterion for a predefined third duration greater than the hold-time defined in the hold-time configuration.

10. The system of claim 6, wherein the first subset comprises agents with a greater number of rejected time-offs than agents of the second subset.

11. A method of prioritising time-off requests in a digital schedule, the method comprising, using a computer processor:

identifying one or more agent profiles which satisfy a predefined schedule criterion using a schedule request manager microservice operated by a computer server and storing and retrieving schedule data;

sending, to at least one agent corresponding to the identified one or more agent profiles, one or more time periods on which to take a time-off, prompting, via the digital message, the at least one agent a user Interface window, wherein the user Interface window includes a clickable hyperlink navigates to a web application allowing the at least one agent to interact with the clickable hyperlink and initiate an approval process of a time-off request;

wherein the one or more time periods are generated in accordance with staffing prediction data for the time periods;

classifying a determined set of agents including the at least one agent into at least two subsets in accordance with historic time-off data; and prioritising an approval of a time-off request submitted to an agent terminal computer device using a time-off request platform and the schedule request manager microservice by an agent of a first subset of the at least two subsets over an approval of a time-off request submitted to the agent terminal computer device using the time-off request platform and the schedule request manager microservice by an agent of a second subset of the at least two subsets, wherein the prioritising comprises:

saving, by the schedule request manager microservice, relevant agents information including information of the agents of the first and second subsets to a database;

defining a hold-time configuration used by the schedule request manager microservice to hold or delay approval of time-off requests, and saving the hold-time configuration in a digital storage;

initiating the approval process of the time-off request submitted by the agent of the first subset;

delaying, via the schedule request manager microservice, initiation of the approval process for the time-off request submitted by the agent of the second subset by holding the time-off request in a hold state and making the time-off request wait in the hold state until hold hours defined by the hold-time configuration have expired;

automatically approving the time-off request submitted by the agent of the second subset by the schedule request manager microservice in response to determining that the hold-time has elapsed and is equal to zero; and upon approval of the time-off request submitted by the agent of the second subset, updating the database by deleting the information of the agent of the second subset, wherein the schedule request manager microservice executes an automated approval workflow that performs the saving, holding, monitoring, delaying, approving, and database updating without manual intervention, thereby reducing concurrent processing conflicts of the time-off requests and improving utilization of staffing resources within a digital scheduling system.

12. The method of claim 11, further comprising prioritising a processing of a time-off request submitted by one of the determined set of agents.

13. The method of claim 12, wherein the prioritising further comprises approving or rejecting a time-off request submitted by an agent belonging to a first subgroup, and approving or rejecting a time-off request submitted by a different agent belonging to a second subgroup after a predetermined time.

14. The method of claim 13, wherein the first subgroup comprises agents with a greater number of rejected time-offs than agents of the second subgroup.

15. The method of claim 13, wherein the prioritising further comprises approving or rejecting a time-off request submitted by an agent which does not satisfy the predefined schedule criterion only after approving or rejecting any requests from agents belonging to the first or second subgroups.

16. The method of claim 11, wherein the predefined schedule criterion comprises a first number of time-offs not taken within a second number of months.

* * * * *